(12) United States Patent
Crissman et al.

(10) Patent No.: US 11,047,803 B1
(45) Date of Patent: Jun. 29, 2021

(54) GLASS CONTAINER INSPECTION SYSTEM

(71) Applicant: Applied Vision Corporation, Cuyahoga Falls, OH (US)

(72) Inventors: Benjamin James Crissman, Deerfield, OH (US); Michael Leo Kress, Uniontown, OH (US); Jacob Joseph Trombetta, Cuyahoga Falls, OH (US)

(73) Assignee: Applied Vision Corporation, Cuyahoga Falls, OH (US)

( * ) Notice: Subject to any disclaimer, the term of this patent is extended or adjusted under 35 U.S.C. 154(b) by 0 days.

(21) Appl. No.: 17/110,277

(22) Filed: Dec. 2, 2020

Related U.S. Application Data

(60) Provisional application No. 63/076,763, filed on Sep. 10, 2020.

(51) Int. Cl.
| | | |
|---|---|---|
| *G01N 21/88* | (2006.01) | |
| *H04N 5/225* | (2006.01) | |
| *G01N 21/90* | (2006.01) | |
| *G02B 17/02* | (2006.01) | |

(Continued)

(52) U.S. Cl.
CPC ......... *G01N 21/8851* (2013.01); *G01N 21/90* (2013.01); *G02B 17/023* (2013.01); *G06T 7/001* (2013.01); *H04N 5/2256* (2013.01); *H04N 5/247* (2013.01); *G01N 2201/0636* (2013.01); *G01N 2201/06126* (2013.01)

(58) Field of Classification Search
CPC .............. G01N 21/8851; G01N 21/90; G01N 21/9036; G01N 2201/0636; G02B 17/023; H04N 5/2256; H04N 5/247
See application file for complete search history.

(56) References Cited

U.S. PATENT DOCUMENTS

| | | | | |
|---|---|---|---|---|
| 3,942,001 A | * | 3/1976 | O'Connor .......... | G01N 21/9018 |
| | | | | 250/223 B |
| 5,495,330 A | * | 2/1996 | Champaneri ...... | G01N 21/9036 |
| | | | | 250/223 B |

(Continued)

FOREIGN PATENT DOCUMENTS

| | | | | |
|---|---|---|---|---|
| DE | 4022733 C1 | * | 5/1991 | ............. G01N 21/90 |
| GB | 2318635 A | * | 4/1998 | ........... G01N 21/909 |

*Primary Examiner* — Jamie J Atala
*Assistant Examiner* — Michael Robert Cammarata
(74) *Attorney, Agent, or Firm* — Medley, Behrens & Lewis, LLC

(57) ABSTRACT

A glass container inspection system including a diffuse illuminator configured to provide diffused light arranged to illuminate a portion of a glass container symmetrically about a central axis of the container. The inspection system further includes an image capture system that generates at least one image that includes a plurality of views of the glass container illuminated by the diffused light. The at least one image may include a view of the portion of the container reflected by a mirror. The glass container inspection system yet further includes a computing system in communication with the image capture system. The computing system can be configured to output an indication as to whether the container is defective based upon the data from the image capture system. The computing system can be further configured to output the indication responsive to detecting a check in the sidewall of the glass container.

20 Claims, 13 Drawing Sheets

(51) Int. Cl.
  *H04N 5/247* (2006.01)
  *G06T 7/00* (2017.01)

(56) References Cited

U.S. PATENT DOCUMENTS

| | | | | |
|---|---|---|---|---|
| 5,661,294 | A * | 8/1997 | Buchmann | G01N 21/9054 |
| | | | | 250/223 B |
| 5,699,152 | A * | 12/1997 | Fedor | G01N 21/909 |
| | | | | 356/240.1 |
| 5,729,340 | A * | 3/1998 | Griesbeck | B07C 5/122 |
| | | | | 356/240.1 |
| 6,104,482 | A | 8/2000 | Brower et al. | |
| 6,512,239 | B1 | 1/2003 | Weiss et al. | |
| 6,654,116 | B1 * | 11/2003 | Kwirandt | G01N 21/909 |
| | | | | 209/524 |
| 6,795,176 | B1 * | 9/2004 | Tennakoon | B07C 5/34 |
| | | | | 250/223 B |
| 9,322,787 | B1 | 4/2016 | Huibregtse et al. | |
| 10,012,598 | B2 | 7/2018 | Huibregtse et al. | |
| 2004/0134843 | A1 | 7/2004 | Kolb | |
| 2004/0263620 | A1 * | 12/2004 | Diehr | G01N 21/8806 |
| | | | | 348/127 |
| 2006/0126060 | A1 * | 6/2006 | Colle | G01N 21/9054 |
| | | | | 356/239.4 |
| 2008/0095427 | A1 | 4/2008 | Novini et al. | |
| 2011/0007149 | A1 | 1/2011 | Diehr et al. | |
| 2016/0077020 | A1 * | 3/2016 | Leconte | G01N 21/9036 |
| | | | | 356/239.4 |
| 2018/0143143 | A1 * | 5/2018 | Coetzee | G01N 21/9036 |
| 2019/0204238 | A1 * | 7/2019 | Fayolle | G01B 11/303 |
| 2020/0333259 | A1 * | 10/2020 | Fouilloux | G01N 21/9054 |

* cited by examiner

GLASS CONTAINER INSPECTION SYSTEM

RELATED APPLICATION

This application claims priority to U.S. Provisional Patent Application No. 63/076,763, filed on Sep. 10, 2020, and entitled "GLASS CONTAINER INSPECTION SYSTEM", the entirety of which is incorporated herein by reference.

BACKGROUND

During manufacture of a glass container, defects may be introduced into one or more sidewalls of the glass container. An exemplary defect in a glass container is referred to as a check, which is a crack in the glass container (e.g., often found in the finish of a glass bottle). A check in a glass container is typically caused by a defect in a manufacturing process at a facility; thus, checks are likely to occur in other glass containers that are manufactured using the manufacturing process at the facility.

Conventional approaches for detecting checks tend to be time-consuming and mechanically complex. In a first example, glass containers can be sampled off of a conveyor, such that approximately one of every N glass containers is inspected for checks. A human can pick up the glass container and visually inspect the glass container for existence of a check; if a check is identified, the bottle is discarded and a line may be shut down to analyze the manufacturing process. In another example, an automated inspection system can be added to a line, where the automated inspection system rotates the glass container and collimated light is directed towards specific positions on the glass container. Images are captured at these specific positions to ascertain whether or not a check exists at such positions. The mechanics involved in rotating glass containers are complex, expensive, and are subject to breakage. In addition, when each glass container is inspected, utilizing such an automated system slows the line, as each glass container must be stopped and rotated.

SUMMARY

The following is a brief summary of subject matter that is described in greater detail herein. This summary is not intended to be limiting as to the scope of the claims.

In an exemplary embodiment, described herein is a glass container inspection system. The glass container inspection system includes a diffuse illuminator configured to provide diffused light. The diffuse illuminator can be arranged to illuminate a portion of a glass container symmetrically about a central axis of the container. The glass container inspection system further includes an image capture system configured to generate at least one image that includes a plurality of views of the glass container illuminated by the diffused light. The image capture system can generate the at least one image as the diffused light passes through a sidewall of the glass container. The at least one image may include a view of the portion of the container reflected by a mirror. The glass container inspection system yet further includes a computing system in communication with the image capture system. The computing system can be configured to output an indication as to whether the container is defective based upon the data from the image capture system. The computing system can be further configured to output the indication responsive to detecting a check in the sidewall of the glass container.

A method of forming the container inspection system includes arranging a diffuse illuminator to illuminate a portion of a glass container with diffuse light. The method further includes arranging a mirror to reflect a portion of the glass container illuminated by the diffuse illuminator. The method also includes placing an image capture system at a location to capture a plurality of views of the glass container illuminated by the diffuse light. The image capture system can include a camera configured to capture an image. The image captured by the camera may include a first view of the portion of the glass container and a second view of the portion of the glass container. The first view and the second view can be included in a second mirror that is pointed towards the portion of the glass container. The second view may be based upon the reflection from the mirror.

In another exemplary embodiment, described herein is a glass container inspection system comprising a diffuse illuminator configured to provide diffuse light. The diffuse illuminator can be arranged to illuminate a portion of a glass container symmetrically about a central axis of the glass container. The container inspection system further includes an annular mirror arranged between the diffuse illuminator and a glass container being inspected. The annular mirror can include an aperture with a cross-section smaller than an inner cross-section of an open end of the glass container to permit diffused light to pass therethrough, and thus pass through the transparent or semi-transparent container near the top of the container. The annular mirror may be arranged to reflect a portion of the glass container. The container inspection system also includes a plurality of planar mirrors each arranged to reflect views of the portion of the glass container illuminated by the diffused light and views of a portion of the annular mirror. The container inspection system yet further includes a camera configured to capture at least one image. The at least one image can include the reflections from the plurality of planar mirrors simultaneously. The container inspection system additionally includes a computing system in communication with camera. The computing system can be configured to output an indication as to whether the glass container is defective based upon the data from the camera. The computing system may be configured to output the indication responsive to detecting a check in the sidewall of the glass container The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
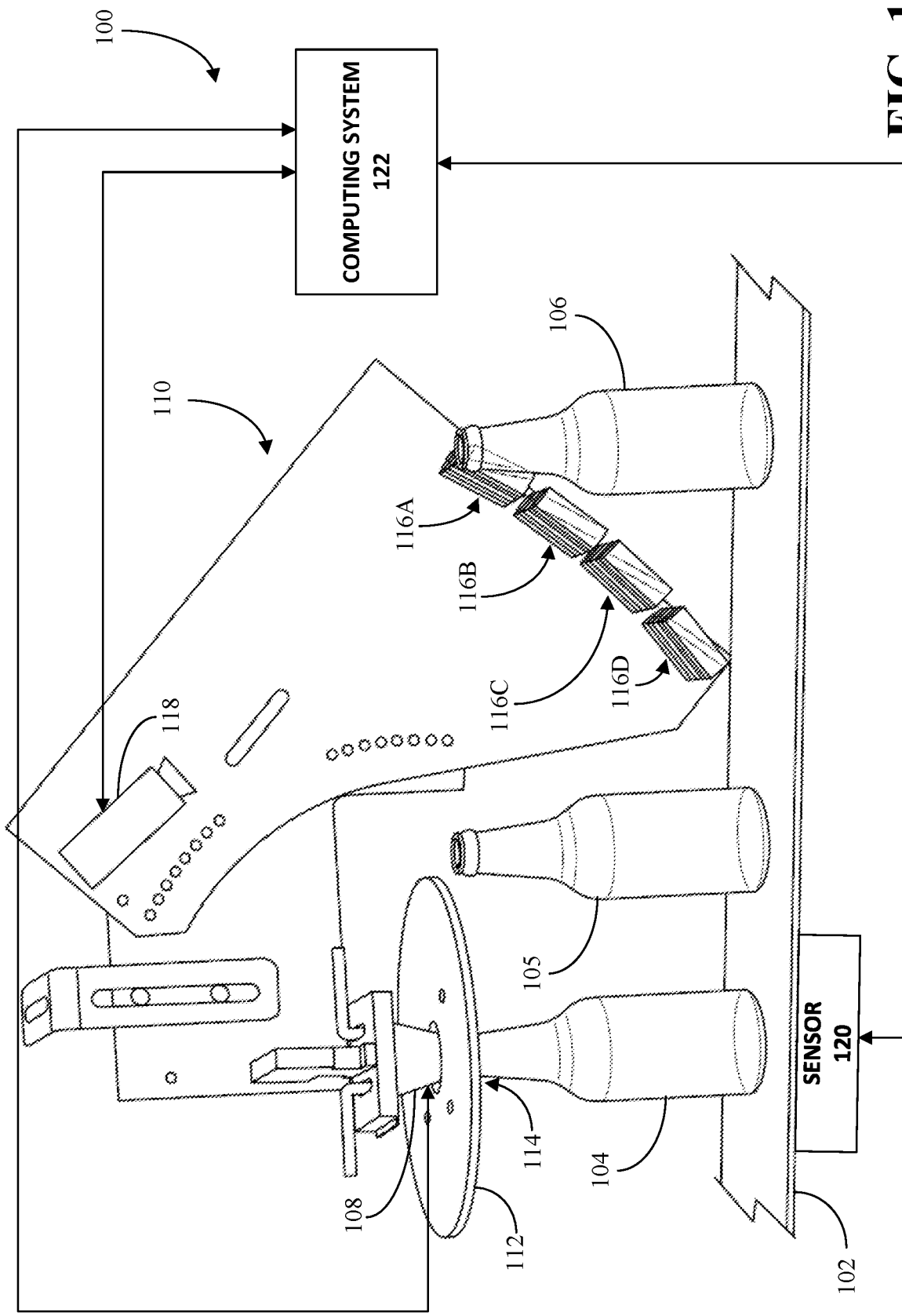
FIG. 1 illustrates an exemplary container inspection system.

Various technologies pertaining to a system for inspecting a glass container are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an apparatus for inspecting a glass container for flaws in a body of the glass container (e.g., for flaws in a finish of a glass bottle). As noted above, conventional approaches for detecting checks tend to be time-consuming and mechanically complex. They involve a human picking up a glass container and visually inspecting for a crack or an automated inspection system rotating the glass container and directing collimated light towards specific positions on the glass container and capturing images of those specific positions while collimated light is directed towards such positions. Manually removing a glass container for visual inspection or rotating the glass container slows the conveyor line down because each glass container must be manipulated. In contrast, the embodiments described herein can be performed without requiring a glass container to be rotated during inspection because diffuse light is emitted to symmetrically illuminate the glass container about a central axis of the glass container, resulting in even illumination of the glass container. The even illumination allows for images to be gathered from multiple sides of the glass container simultaneously without requiring rotation of the glass container, light source, and/or image capture device and thus, without requiring the conveyor line to be slowed down for manual manipulation of the glass containers.

Turning to FIG. 1, illustrated is an exemplary embodiment of a container inspection system 100 configured to illuminate a glass container and to inspect the illuminated glass container. A conveyor 102 transports a plurality of glass containers 104-106 through the container inspection system 100. The container inspection system 100 comprises an illuminator 108 configured to emit light to illuminate the plurality of glass containers 104-106 as they travel through the container inspection system 100. The container inspection system 100 also comprises an image capture system 110 configured to capture one or more images of each of the plurality of glass containers 104-106 as the plurality of glass containers 104-106 are transported through the container inspection system 100 by the conveyor 102. The image capture system 110 can be configured to capture the image(s) during illumination of each container by the illuminator 108, as will be described in detail below.

The illuminator 108 can take any suitable shape and/or comprise any suitable components for providing light to illuminate each of the plurality of glass containers 104-106 as the plurality of glass containers 104-106 are transported through the container inspection system 100 by the conveyor 102. For instance, the illuminator 108 can include a light source(s) configured to emit light at specified times such as when a container is directly beneath the illuminator 108. Any suitable light source may be employed and the light source may be selected based on any number of characteristics, such as type of container being inspected, type of defect to be detected, desired type of emitted light, and/or the like. In an example, the illuminator 108 can include an electroluminescence light source such as a light emitting diode (LED). In the illustrated embodiments, the containers 104-106 are formed of a transparent or semi-transparent material (such as glass) and the light from the illuminator 108 passes through a sidewall(s) of a container as the container is beneath the illuminator 108 to illuminate the container.

The illuminator 108 can include any suitable number of light sources and the number may depend on the desired type of light or any other suitable factor. For instance, the illuminator 108 can include a plurality of LEDs organized in a particular arrangement. Each LED can be configured to emit a similar light or the light can vary. It is to be understood, however, that other types of light source are contemplated.

The illuminator 108 may further include a device and/or structure that alters the light emitted from the light source. For instance, the illuminator 108 may optionally include a lens or plurality of lenses that focuses light from the light source toward a specific portion(s) of the container and/or a diffusing element that diffuses light.

More specifically, the illuminator 108 may include a diffuser that diffuses or scatters light from the light source to evenly illuminate a glass container (e.g., the first container 104). Diffusing the light from the light source may result in symmetric illumination of a portion of the glass container about a central axis of the container. As noted above, in conventional glass container inspection systems collimated or focused light is aimed at a specific point on the glass container while an image is captured of that point. Because the light is directed toward a specific point on the container in conventional systems, either the container or the light source needs to be rotated in order to capture illuminated images for the whole bottle. By contrast, using a diffuser permits for rotationally symmetric illumination of the container, thereby avoiding the need to rotate the container.

The illuminator 108 may be configured to illuminate any suitable portion of a container that is beneath the illuminator 108 (e.g., the first container 104). For instance, the container may be a bottle and the illuminator 108 may be configured to illuminate a portion of the finish of the bottle (i.e., the upper portion of the bottle). In another example, the illuminator 108 may be configured to illuminate the entire container. Moreover, the illuminator 108 may be configured to emit light for any suitable period of time. For instance, the illuminator 108 may be configured to emit light when a container is directly beneath the illuminator 108. More particularly, the illuminator 108 can be strobed, such that the aforementioned container surface is illuminated for a relatively short amount of time (e.g., on the order of tens of microseconds) when the container is detected as being directly beneath the illuminator 108.

As briefly mentioned above, the image capture system 110 is configured to capture at least one image of each of the plurality of containers 104-106 as the containers 104-106 are transported through the container inspection system 100 by the conveyor 102. In one example, the image capture system 110 may be configured to capture the image(s) of a container (e.g., the first container 104) when the container is directly beneath the illuminator 108. Further, the image capture system 110 can be configured to capture the image(s) of the container when the container is illuminated by the illuminator 108. The image capture system 110 can include any suitable number of image capture instruments that are each configured to capture any suitable number of images of the plurality of containers 104-106. For instance, the image capture system 110 may comprise one and only one image capture instrument that captures an image that includes several views of a container. In another embodiment, the image capture system 110 may comprise a plurality of image capture instruments that each (simultaneously) capture a different image of a container, with each image including a different view of the container. The image capture system 110 can be configured to capture the image(s) for each of the plurality of containers 104-106 during their illumination by the illuminator 108.

In the embodiment illustrated in FIG. 1, an image of a container (e.g., the first container 104) captured by the image capture system 110 can include several views of the container. The number of views captured in an image, as described below, is dependent upon a number of mirrors included in the image capture system 110.

The image capture system 110 can take any suitable shape and comprise any suitable structure(s) for generating an image that includes multiple views of the container. For instance, the image capture system 110 may comprise a camera or several cameras. In another example, the image capture system 110 may comprise a mirror or several mirrors that are positioned to capture view(s) of a container while the container is being illuminated.

Illustrated in FIG. 1 is a first embodiment of the image capture system 110, where the image capture system 110 includes a plurality of different mirrors. In the illustrated embodiment, the image capture system 110 includes a mirror that is arranged between the illuminator 108 and a container (e.g., the first container 104) on the conveyor 102.

The mirror can take any suitable shape and/or size for reflecting a portion of the container thereon. For instance, the mirror may have a cross-section that is circular, rectangular, triangular, ovular, or the like. In the illustrated embodiment, the mirror comprises an annular mirror 112. The annular mirror 112 includes an aperture 114 extending therethrough permitting light from the illuminator 108 to reach a container that is directly beneath the illuminator 108. The aperture 114 can have any suitable cross-section for permitting light from the illuminator 108 to pass through to illuminate the container. In the illustrated embodiment, the aperture 114 has a circular cross-section with a diameter smaller than a diameter of an open end of the container facing the annular mirror 112.

Figure 2:
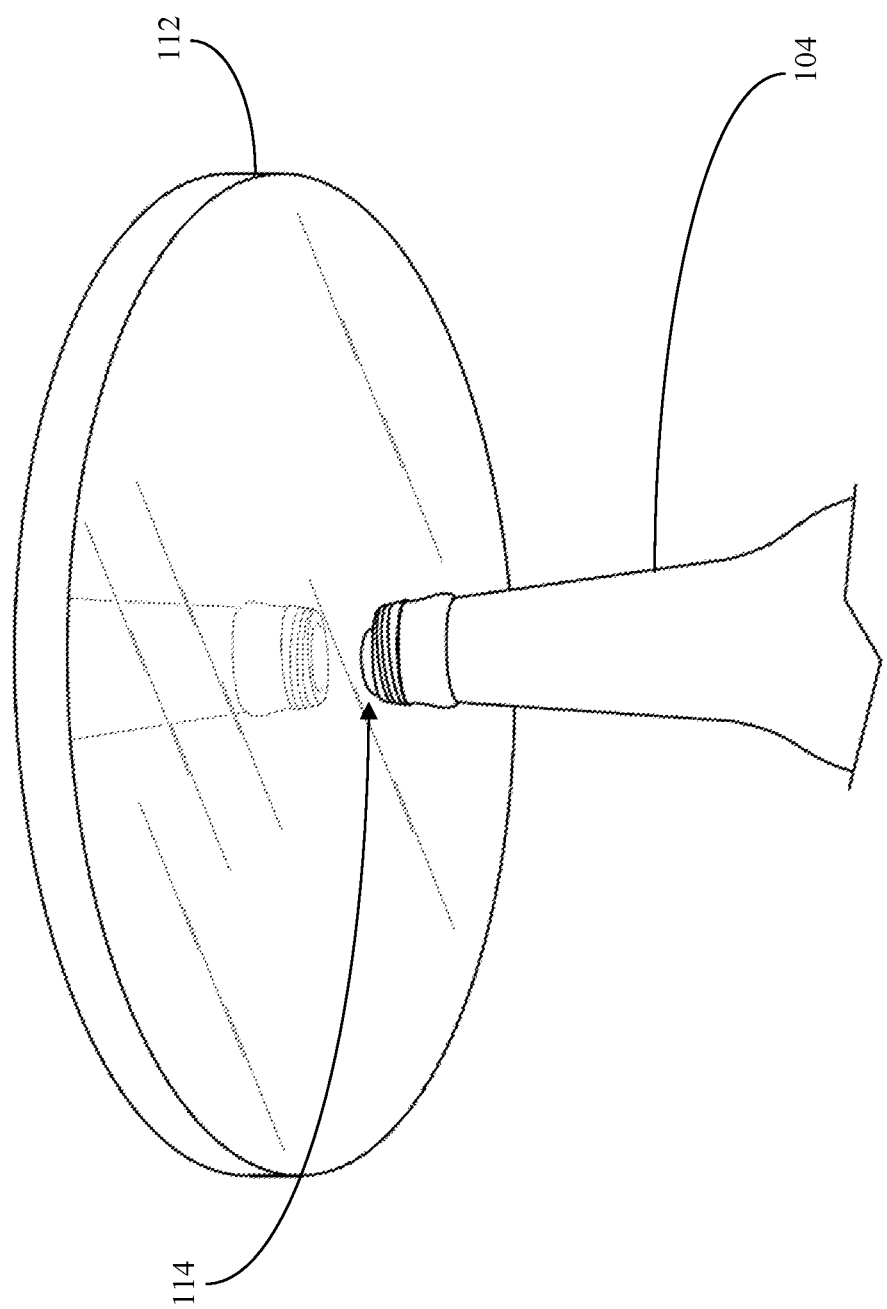
FIG. 2 illustrates another exemplary container inspection system.

The annular mirror 112 can be configured to be reflective on every surface or only a portion thereof. For instance, in the embodiment illustrated in FIGS. 1 and 2, the surface of annular mirror 112 facing downward toward the container is reflective such that portion(s) of the container are reflected in the annular mirror 112 when a point of view is beneath the annular mirror 112. The surface of the annular mirror 112 that reflects the container can take any suitable shape; and in the example depicted in FIGS. 1 and 2 the surface is planar and is substantially perpendicular to an open end of the container. This reflection of the container by the annular mirror 112 can be seen more clearly in FIG. 2.

The image capture system 110 may further include an additional reflective surface that is arranged to simultaneously reflect a portion of the container and a portion of the annular mirror 112. By reflecting the container and the reflection of the container in the annular mirror 112 at the same time, two different views of the container can be observed in the additional reflective surface. The additional reflective surface can take any suitable shape and size for reflecting the container and the annular mirror 112. For instance, the additional reflective surface may be rectangular, triangular, ovular, circular, or the like; and, moreover, may be planar, oscillating, or the like. For instance, illustrated in FIG. 1 is a rectangular, planar additional reflective surface 116A.

The image capture system 110 can include any number of additional reflective surfaces. Each of the additional reflective surfaces can be similar in shape and size or can vary. For instance, in the embodiment illustrated in FIG. 1, the image capture system 110 includes four additional reflective surfaces 116A-D that are each rectangular and planar.

Each of the four additional reflective surfaces 116A-D can be arranged at a suitable location for simultaneously reflecting a view of the container being inspected (e.g., the first container 104) and a view of the reflection of the container from the annular mirror 112. Each of the four additional reflective surfaces 116A-D can be arranged to reflect a different view of the container and/or a different view of the reflection of the container from the annular mirror 112. For instance, a first additional reflective surface 116A can be arranged at a first position relative to the annular mirror 112 while a second additional reflective surface 116B can be arranged at a different second position relative to the annular mirror 112. In the illustrated embodiment, the four additional reflective surfaces 116A-D are arranged along a curved path.

The image capture system 110 may further include a camera 118 configured to capture an image of one or more of the additional reflective surfaces while the container 104 is being illuminated by the illuminator 108. The camera 118 can be placed at any suitable location and can include any suitable structure to capture the image of the one or more additional reflective surfaces 116A-116D. The image capture system 110 can include any suitable number of cameras to capture images of the additional reflective surfaces 116A-116D while the container is being illuminated by the illuminator 108. For instance, a first camera can be positioned to capture an image of a first additional reflective surface and a second camera can be positioned to capture an image of a second additional reflective surface.

In the embodiment illustrated in FIG. 1, the camera 118 is configured to capture an image of each of the four additional reflective surfaces 116A-D while the container is being illuminated by the illuminator 108 and is directly beneath the illuminator 108. In order to capture a clear image of each of the additional reflective surfaces 116A-116D, the camera 118 can be placed such that each additional reflective surface 116A-116D is the same focal distance from the camera 118.

The container inspection system 100 can further comprise a sensor 120 that outputs a signal that is indicative of when a container (e.g., the first container 104) has reached an inspection region directly underneath the illuminator 108. As described above, the image capture system 110 is configured to capture an image(s) of the first container 104 when the first container 104 is in the inspection region. Any suitable sensor 120 for detecting when the container has reached the inspection region may be employed. For instance, the sensor 120 may be a presence sensor that can detect when the first container 104 has reached a particular point (e.g., when the first container 104 is directly underneath the illuminator 108). In another example, the sensor 120 may be a rotary sensor that is configured to output data based upon movement of the conveyor 102. The output data, therefore, is indicative of a position of the first container 104 relative to a previous position of the first container 104 on the conveyor 102 and, thus, the position of the first container 104 relative to the inspection region.

The container inspection system 100 may further comprise a computing system 122 that receives the signal output by the sensor 120. The computing system 122 can receive the signal from the sensor 120 by way of a wireless or wireline connection. The computing system 122 may further receive information from and/or transmit information to the illuminator 108 and/or the image capture system 110. For instance, the computing system 122 may transmit a signal to the illuminator 108 to cause the illuminator 108 to emit light. The signal sent to the illuminator 108 may be sent responsive to the computing system 122 receiving the signal output by the sensor 120 indicating a container, such as the first container 104, is directly underneath the illuminator 108. By way of an example, the computing system 122 can be configured to transmit a signal to the illuminator 108 that causes the illuminator 108 to strobe light each time a container is detected as being directly beneath the illuminator 108.

By way of another example, the computing system 122 may transmit an image request signal to the camera 118 to cause the camera 118 to capture the image(s) of a container in the inspection region. The computing system 122 can be configured to transmit the image request signal responsive to receiving the signal output by the sensor 120, simultaneously with the signal transmitted to the illuminator 108 discussed above, after the signal is transmitted to the illuminator 108, and/or any other suitable time. For instance, the computing system 122 may be configured to substantially simultaneously send a signal to the illuminator 108 and a signal to the camera 118 such that when light from the illuminator 108 is emitted to illuminate the container, the camera 118 simultaneously captures the image(s) of the illuminated container. The computing system 122 may be further configured to receive data from the camera 118 such as one or more images generated by the camera 118. The computing system 122 can then determine whether the container includes a defect (e.g., a check) based upon the image(s) of the illuminated container.

Figure 3:
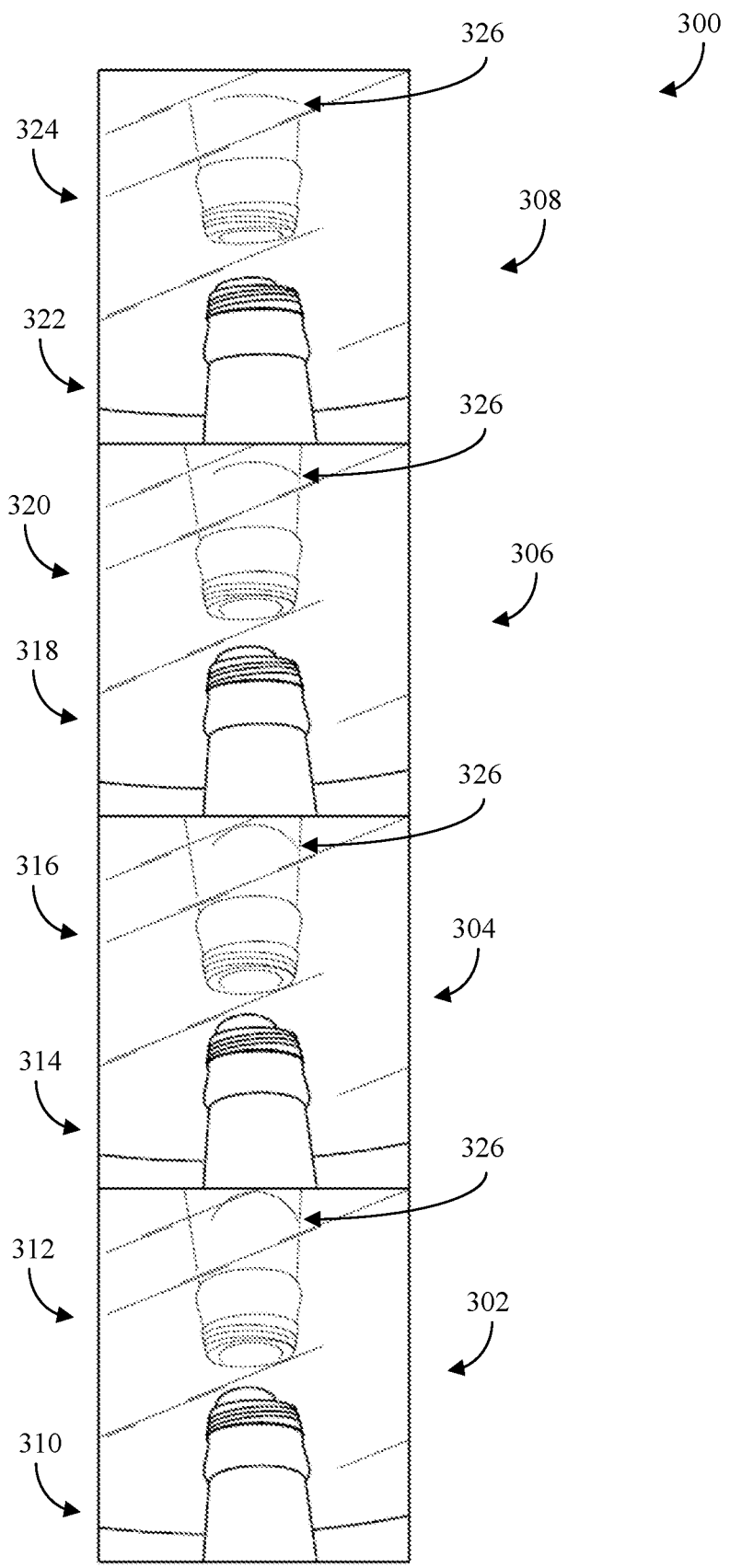
FIG. 3 illustrates an image gathered by an image capture system of an exemplary container inspection system.

Turning now to FIG. 3, illustrated is an exemplary image 300 captured by the camera 118. In the illustrated example, the image 300 includes eight views of a container: four reflections of the container in the additional reflective surfaces 116A-D, respectively, and four double-reflections of the container (reflections of the container in the annular mirror 112 that are again reflected in the additional reflective surfaces 116A-D, respectively). Thus, the camera 118 captures the image 300 when the image capture system 110 includes the four additional reflective surfaces 116A-D described above.

The image 300 includes four sections each including two views: a view of the container as (directly) reflected from an additional reflective surface and a view of the container as reflected from the annular mirror which is then reflected from the additional reflective surface. A first section 302 includes a first view of the container 310 and a first view of the annular mirror reflecting the container 312 as reflected from the fourth additional reflective surface 116D. A second section 304 includes a second view of the container 314 and a second view of the annular mirror reflecting the container 316 as reflected from the third additional reflective surface 116C. A third section 306 includes a third view of the container 318 and a third view of the annular mirror reflecting the container 320 as reflected from the second additional reflective surface 116B. A fourth section 308 includes a fourth view of the container 322 and a fourth view of the annular mirror reflecting the container 324 as reflected from the first additional reflective surface 116A.

As mentioned above, the image 300 can be received by the computing system 122 and the computing system 122 can then determine whether the finish of the container includes a defect based upon the image 300. For instance, the computing system 122 may align the image 300 with a statistical model of a defect-free container. The statistical model can include expected values of pixels of images at portions of the container as well as an expected distribution of such values, such that the image 300 can be aligned with different portions of the statistical model and a determination can be made as to whether the glass container includes the defect. In another example, templates (also referred to as signatures) for defects that are desirably identified can be employed to detect defects in glass containers. For example, a template may represent a shape of a defect that is to be identified, and the image 300 can be searched for such shape. Responsive to detecting a defect in the inspected container, the computing system 122 can be configured to output a signal indicative of such detection.

As can be seen in the image 300, the inspected container includes a defect 326. The defect 326, in the illustrated embodiment, comprises a check or crack in the finish of the container. A portion of this defect 326 can be seen in each of the first section 302, the second section 304, the third section 306, and the fourth section 308. More particularly, the portion of the defect 326 can be seen in the double-reflections of the container (reflections of the container in the annular mirror 112 that are again reflected in the additional reflective surfaces 116A-D).

Figure 4:
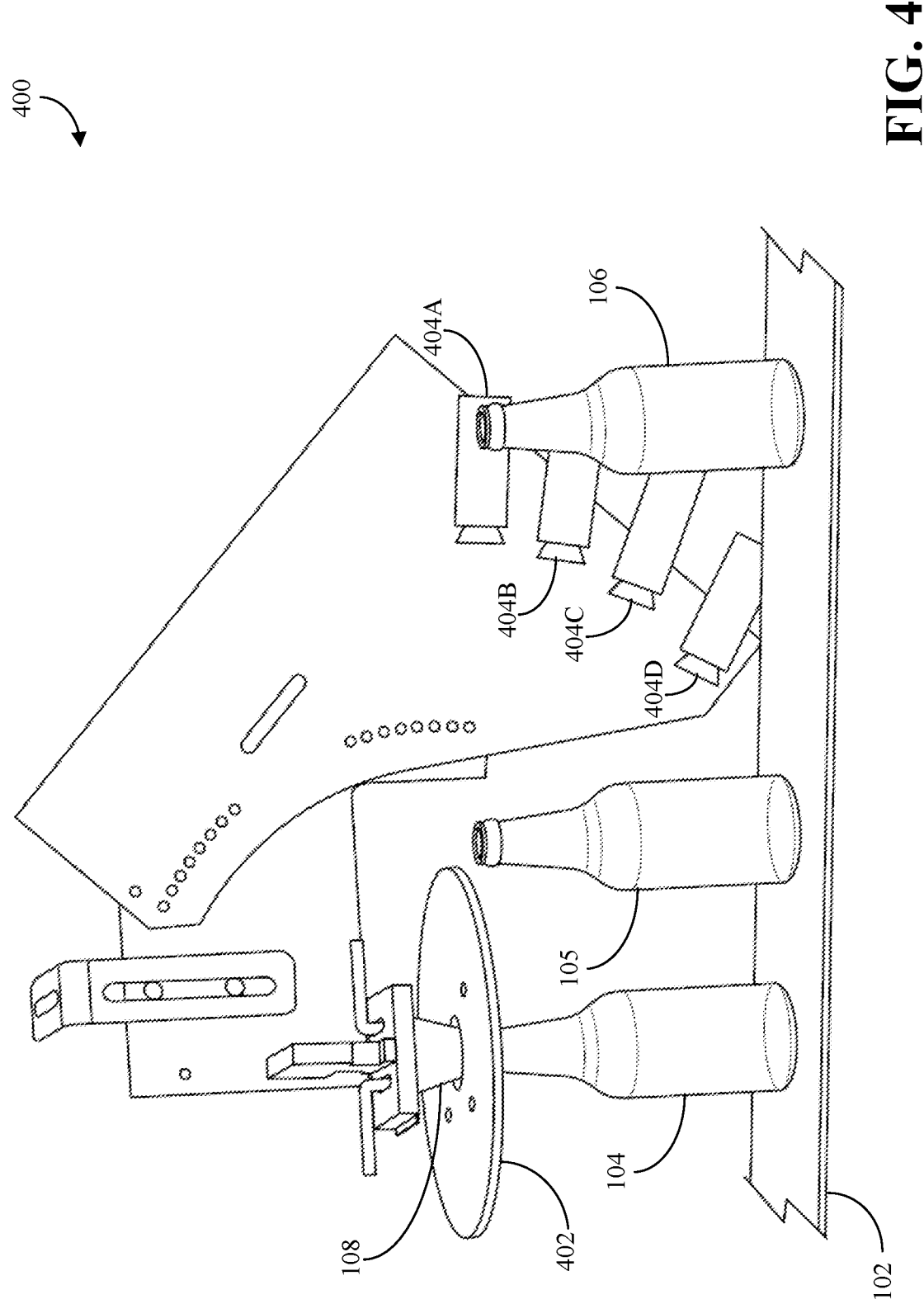
FIG. 4 illustrates a further exemplary container inspection system.

Turning now to FIG. 4, illustrated is another embodiment of an image capture system 400. In the illustrated embodiment, the image capture system 400 includes an annular mirror 402 (similar to the annular mirror 112 described above) configured to reflect a container being inspected, such as the first container 104. Instead of using a plurality of additional reflective surfaces, the illustrated image capture system 400 employs a plurality of cameras 404A-D that function similar to the additional reflective surfaces described above. More particularly, each camera in the plurality of cameras 404A-D is configured to capture an image comprising a view of the container being inspected and a view of the annular mirror 402 reflecting the container. The plurality of cameras 404A-D can be arranged at any suitable position(s) for collecting the images. In the illustrated embodiment, the plurality of cameras 404A-D are arranged along an arced path.

The computing system 122 can be configured to receive images generated from the plurality of cameras 404A-D. The computing system 122 can then identify a defect in one or more containers based upon the received images. In one embodiment, templates for a defect can be developed, and the computing system can compare the templates with content of the images to identify defects in glass containers.

Figure 5:
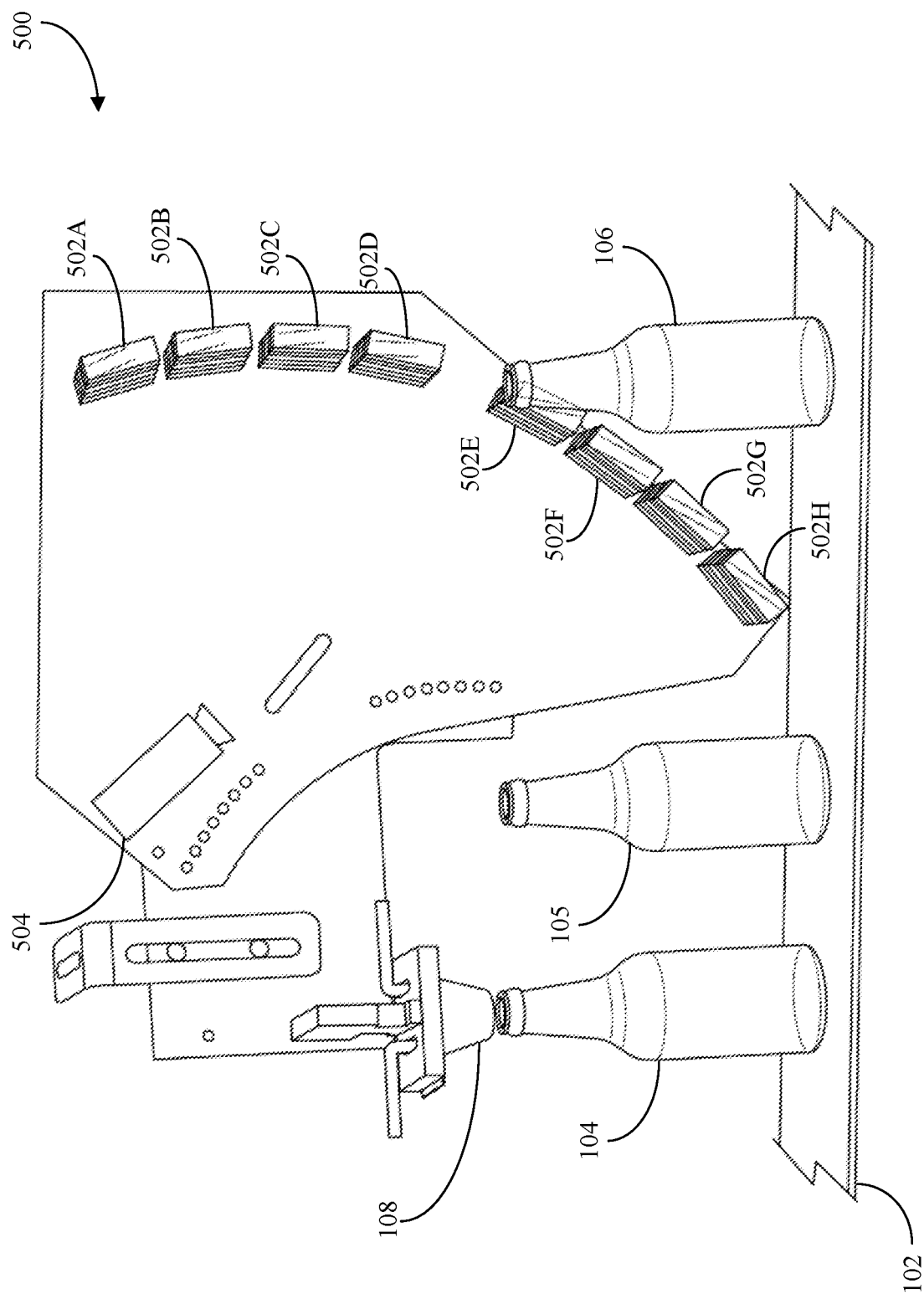
FIG. 5 illustrates a yet further exemplary container inspection system.

Turning now to FIG. 5, illustrated is another embodiment of an image capture system 500. In the illustrated embodiment, the image capture system 500 comprises a plurality of reflective surfaces 502A-H that are arranged to reflect a portion of a container being inspected (e.g., the first container 104) at different views and a camera 504 arranged to capture an image comprising the reflections from the plurality of reflective surfaces 502A-H. The plurality of reflective surfaces 502A-H can be arranged in any suitable pattern for reflecting views of the container. In the illustrated embodiment, the plurality of reflective surfaces 502A-H are arranged along an arced path with a first portion below an open end of the container and a second portion above the open end of the container. The camera 504 can be arranged such that the plurality of mirrors 502A-H are the same focal distance from the camera 504. The computing system 122 can be configured to receive the image from the camera 504 and detect a defect in a glass container based upon the image, as described above.

Figure 6:
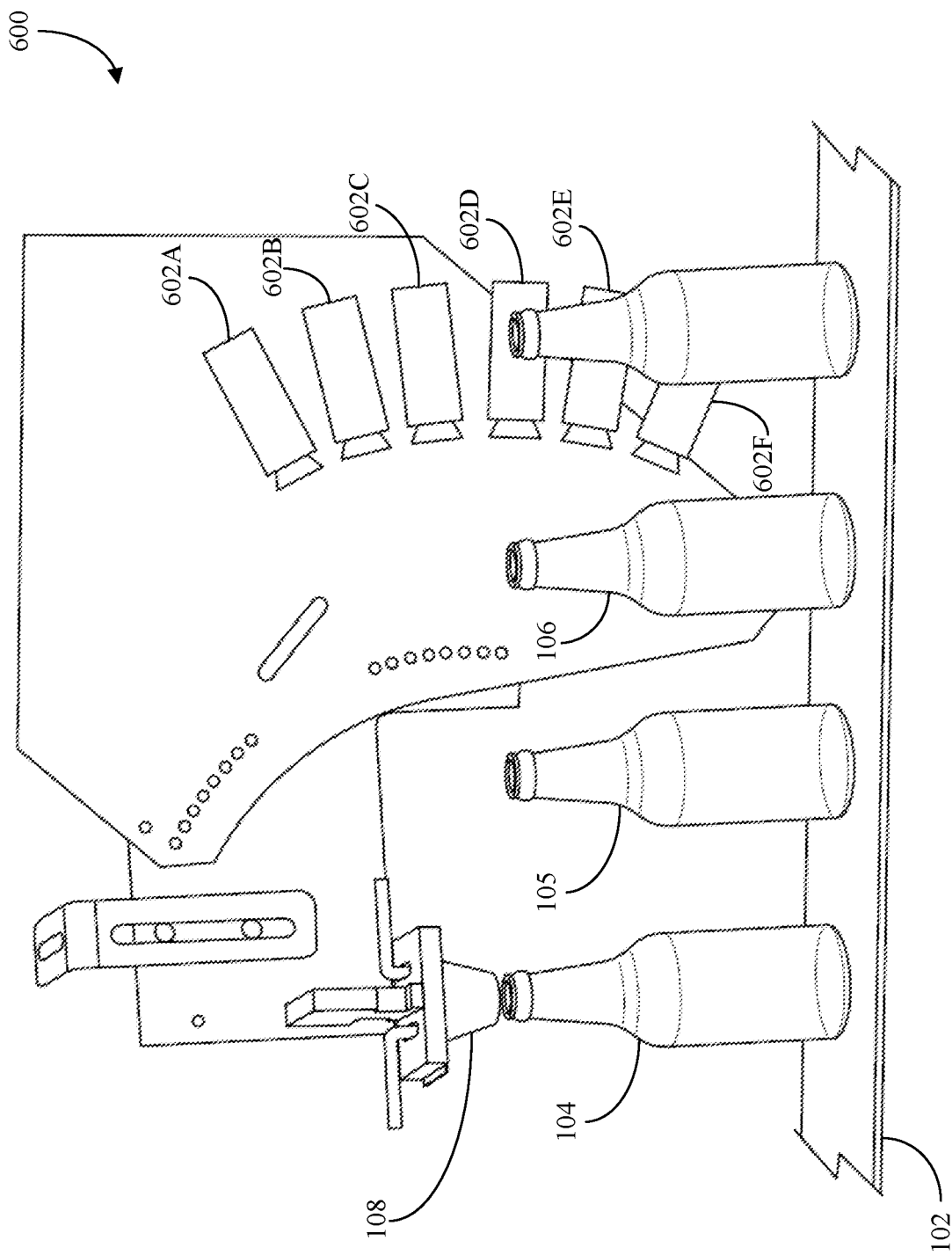
FIG. 6 illustrates yet another exemplary container inspection system.

Turning now to FIG. 6, illustrated is yet another embodiment of an image capture system 600. In the illustrated embodiment, the image capture system 600 comprises a plurality of cameras 602A-F that are each configured to capture images of a portion of a container being inspected (e.g., the first container 104) at different views. Each camera of the plurality of cameras 602A-F can be configured to capture an image comprising a view of the inspected container. The plurality of cameras 602A-F can be arranged in any suitable pattern to capture an image of the portion of the inspected container. In the embodiment of FIG. 6, the plurality of cameras 602A-F are arranged in an arced path with a portion of the plurality of cameras 602A-F arranged below an open end of the container and a second portion of the plurality of the cameras 602A-F arranged above the open end of the container.

The computing system 122 can be configured to receive images generated by the plurality of cameras 602A-F. The computing system 122 can then detect a defect in the glass container based upon the images output by the plurality of cameras 602A-F.

In the previous illustrated embodiments, the reflective surfaces and/or cameras are arranged along a first side of the container to capture an image(s) along the first side of the container. When the illuminator 108 emits diffuse light, the container being inspected is evenly illuminated and an additional image capture system can be used to obtain an image(s) of a second side of the container without requiring rotation of the container. Accordingly, the above described container inspection system 100 can be employed to inspect different sides of the container without touching the container to rotate it.

The container inspection system 100 can include any suitable number of additional image capture systems. The plurality of image capture systems can be similar to each other and/or they can vary. The number of additional image capture systems can be based on any suitable factor, such as size of the container, shape of the container, the amount of container being inspected, or the like. For instance, the container inspection system 100 can include two image capture systems. In another example, the container inspection system 100 can include six image capture systems. In a further example, the container inspection system 100 can include eight image capture systems. The additional image capture systems can be located at any suitable location, as will be described in detail below.

Figure 7:
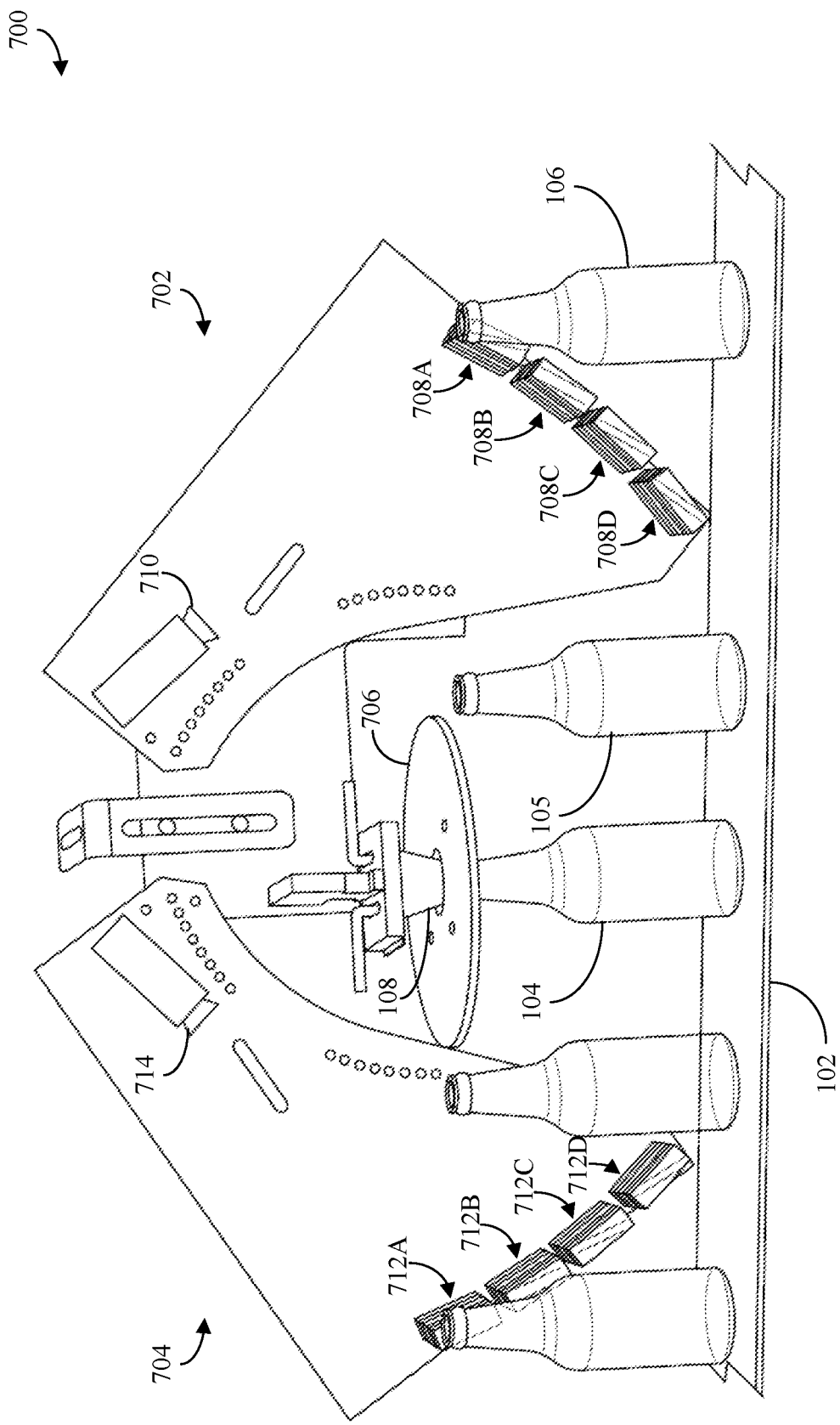
FIG. 7 illustrates another exemplary container inspection system.

Illustrated in FIG. 7 is one embodiment of a container inspection system 700 that includes a first image capture system 702 (similar to the image capture system 110 described above) and a second image capture system 704. In the illustrated embodiment, the first image capture system 702 is located on a first side of a container being inspected (e.g., the first container 104) and the second image capture system 704 is located on a second side of the container opposite the first side.

In the illustrated embodiment, the container inspection system 700 includes an annular mirror 706 that is utilized by both the first image capture system 702 and the second image capture system 704 to capture multiple views of the container.

In the illustrated embodiment, the first image capture system 702 can include four reflective surfaces 708A-D each arranged to reflect an image comprising a view of the container and a view of the container reflected by the annular mirror 706. The first image capture system 702 further includes a camera 710 that captures an image of the reflections from the four reflective surfaces 708A-D.

Similarly, in the illustrated embodiment, the second image capture system 704 can include four reflective surfaces 712A-D each arranged to reflect an image comprising a view of the container and a view of the container reflected by the annular mirror 706. The second image capture system 704 can further include a camera 714 that captures an image of the reflections from the four reflective surfaces 712A-D.

The computing system 122 can be configured to receive the images from the first image capture system 702 and the second image capture system 704 and detect defects in the glass container based upon such images.

Figure 8:
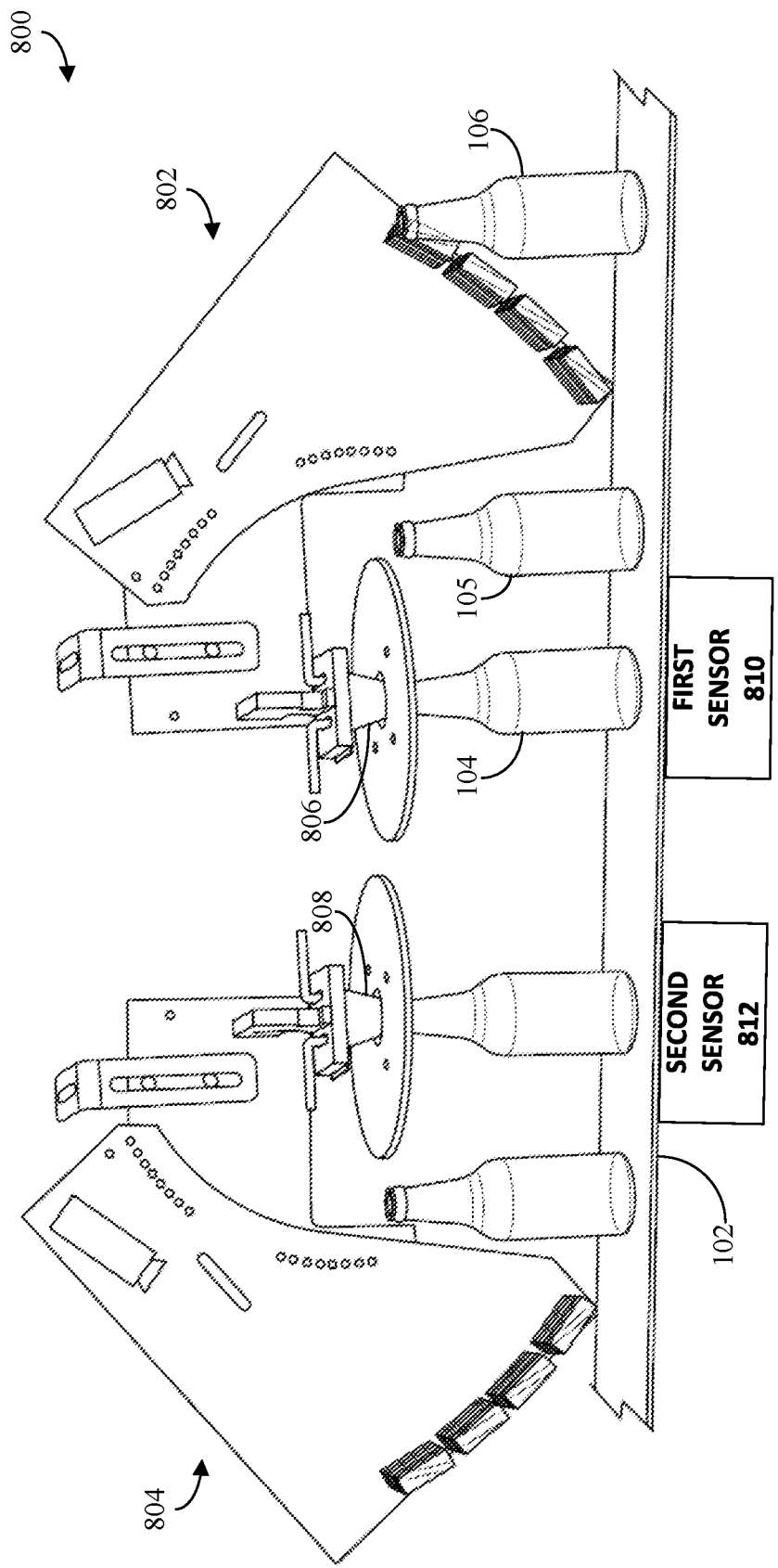
FIG. 8 illustrates a further exemplary container inspection system.

Turning now to FIG. 8, illustrated is another embodiment of a container inspection system 800 that includes a first image capture system 802 and a second image capture system 804. In the illustrated embodiment, the first image capture system 802 is located at a first inspection region along a conveyor path of the container and the second image capture system 804 is located at a second inspection region along the conveyor path of the container.

The first inspection region and the second inspection region can each include a separate illuminator 806 and 808, respectively. The first inspection region and/or the second inspection region may each include a sensor (similar to the sensor 120 described above) that indicates when a container is in the first inspection region and/or second inspection region. In the illustrated embodiment, the first inspection region includes a first sensor 810 and the second inspection region includes a second sensor 812. The first sensor 810 and/or the second sensor 812 can be configured to output a signal indicative of a location of a container (e.g., the first container 104) with respect to the first inspection region and/or the second inspection region.

As discussed above, the first image capture system 802 and the second image capture system 804 can be similar or can vary. In the illustrated embodiment, the first image capture system 802 and the second image capture system 804 are similar with each including an annular mirror (similar to the annular mirror 108 described above) to reflect a view of the container. The first image capture system 802 and the second image capture system 804 can further comprise a plurality of additional reflective surfaces that are arranged to reflect a view of the container and a view of the reflection of the container by the annular mirror simultaneously and a camera arranged to capture an image comprising the reflections from the plurality of additional reflective surfaces. The first image capture system 802 can be configured to capture an image of a first side of the container while the second image capture system 804 can be configured to capture an image of a second side of the container.

The computing system 122 can be configured to receive the images generated by the cameras of the first image capture system 802 and the second image capture system 804. The computing system 122 can be configured to detect a defect in a container based upon the images generated by the cameras.

Figure 9:
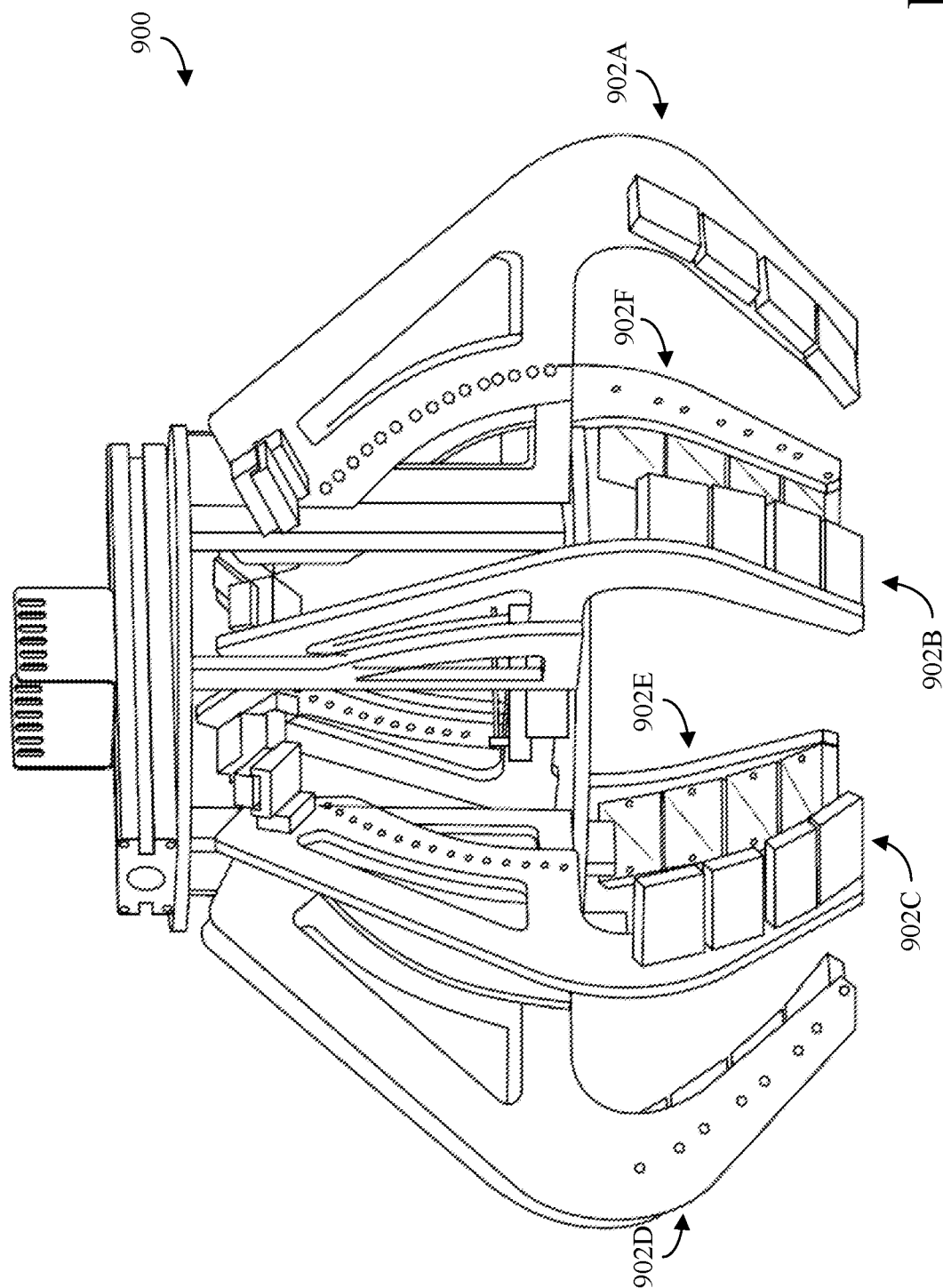
FIG. 9 illustrates a yet further exemplary image capture system.

Turning now to FIG. 9, illustrated is a further image capture system 900 that includes a plurality of arrangements to generate images for 360° inspection of a container via a single illuminator without requiring rotation of the container. Any suitable number and/or type of arrangements may be used to generate the images, such as six arrangements, eight arrangements, etc. In the illustrated embodiment, the image capture system 900 includes six arrangements 902A-F equally spaced around an inspection region for a container (e.g., the first container 104). The image capture system 900 further includes an annular mirror 904 (similar to the annular mirror 112 described above) that reflects a view of the container thereon. Although illustrated as a single annular mirror 904 in FIG. 9, it is conceivable that separate mirrors can be used for one or more of the plurality of arrangements 902A-F.

Each of the arrangements 902A-F include a plurality of planar mirrors (similar to the additional reflective surfaces 116A-D described above); each configured to reflect a view of the container and a view of the reflection of the container by the annular mirror 904 simultaneously. Each of the plurality of arrangements 902A-F can further include a camera configured to capture an image comprising the respective reflections from the plurality of planar mirrors. Accordingly, by organizing the plurality of arrangements 902A-F in the illustrated pattern, the image capture system 900 provides for a 360° inspection of the container via a singular illuminator without requiring rotation of the container. Moreover, the illustrated organization of the plurality of arrangements 902A-F allows for a singular annular mirror 904 positioned above the container to be employed to generate multiple views of the container in each image captured by each camera.

The computing system 122 can be configured to receive the images generated by the cameras of the image capture system 900. The computing system 122 can be configured to detect a defect in a container based upon the images generated by the cameras.

Figure 10:
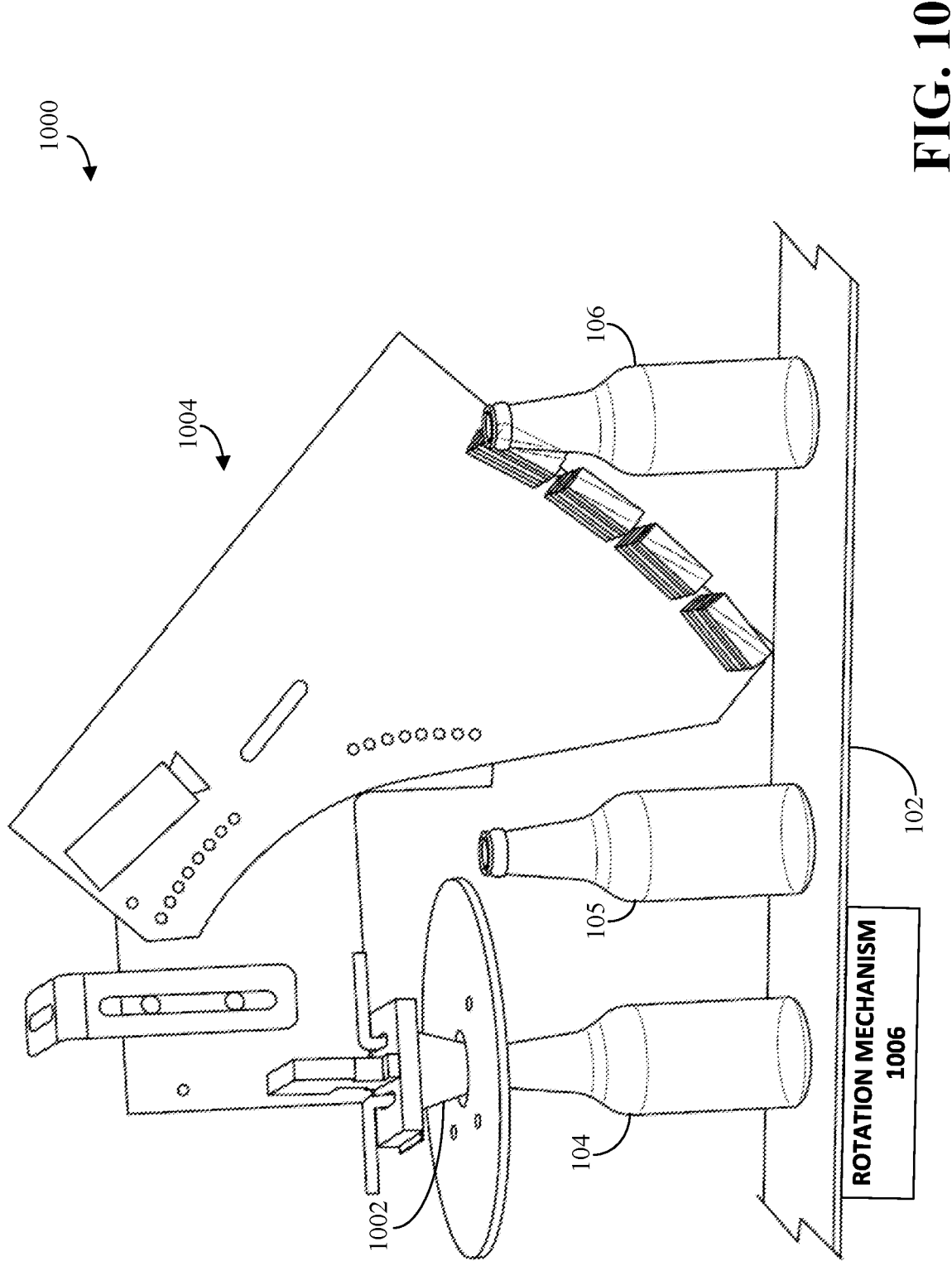
FIG. 10 illustrates yet another exemplary container inspection system.

Turning now to FIG. 10, illustrated is another container inspection system 1000 that comprises an illuminator 1002 (similar to the above described illuminator 108), an image capture system 1004, and a rotation mechanism 1006. In the illustrated embodiment, in lieu of using a plurality of image capture systems to capture views of different sides of a container being inspected, the rotation mechanism 1006 can be employed to rotate the container while the image capture system 1004 captures views for any desired number of sides of the container (e.g., two sides, four sides, or the like). Any suitable image capture system 1004 can be employed for capturing the views of the side of the container, such as the image capture systems described above.

Figure 11:
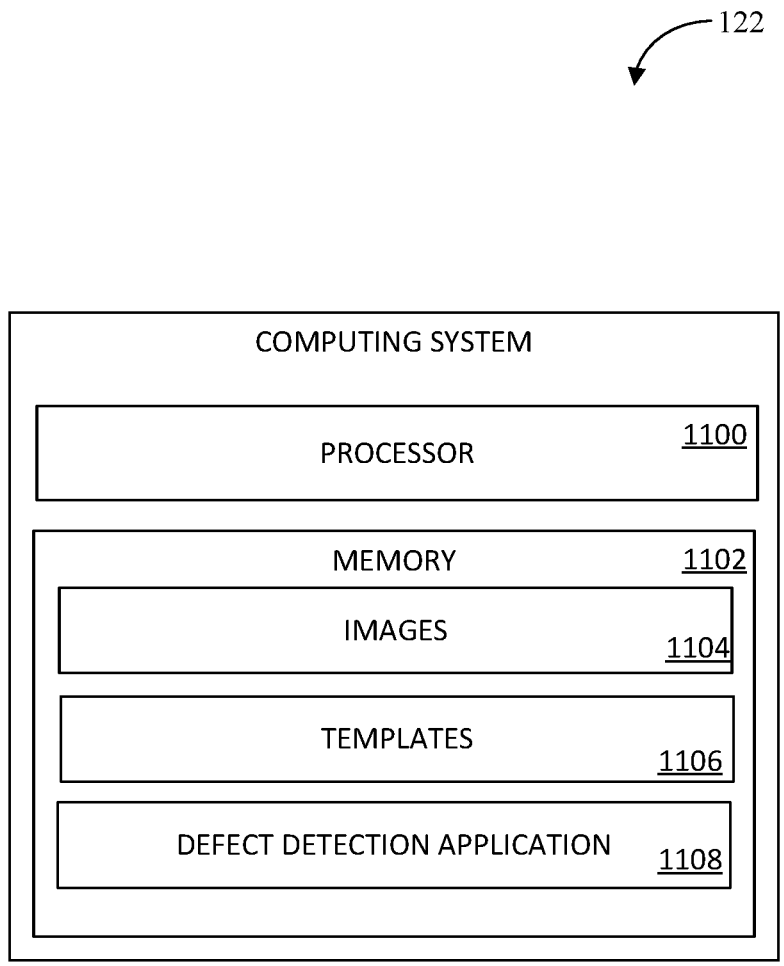
FIG. 11 illustrates depicts a functional block diagram of a computing system of a container inspection system.

Now referring to FIG. 11, a functional block diagram of the computing system 122 is illustrated. The computing system 122 includes a processor 1100 and memory 1102. The memory 1102 has images 1104 (generated by the image capture system(s) of the container inspection system 100) loaded therein. For instance, the images 1104 can comprise: 1) an image capture by a first image capture system; and 2) an image captured by a second image capture system, where the images can be captured when the container is illuminated by way of diffuse light emitted from the illuminator.

Moreover, the memory 1102 has one or more templates 1106, wherein the templates 1106 correspond to defects that are to be detected by the container inspection system 100. In one embodiment, the templates 1106 can include mathematical representations of defects that can be found in a glass container (e.g., a vertical check, a horizontal check, etc.), and the computing system 122 can search images for portions thereof that correspond to such defects.

The memory 1102 further includes a defect detection application 1108 loaded therein. In one embodiment, the defect detection application 1108 may be configured to ascertain whether the container has a defect therein based upon the images 1104 and the templates 1106. More particularly, the defect detection application 1108 may be configured to perform template matching by comparing a template against an image by moving the template around the image to calculate a numerical measure of similarity between the template and the portion of the image it overlaps. For instance, the defect detection application 1108 can use a template image of a defect to scan an image for the defect based on the numerical measure. The defect detection application 1108 can be further configured to output a signal indicating that the inspected container is defective.

Figure 12:
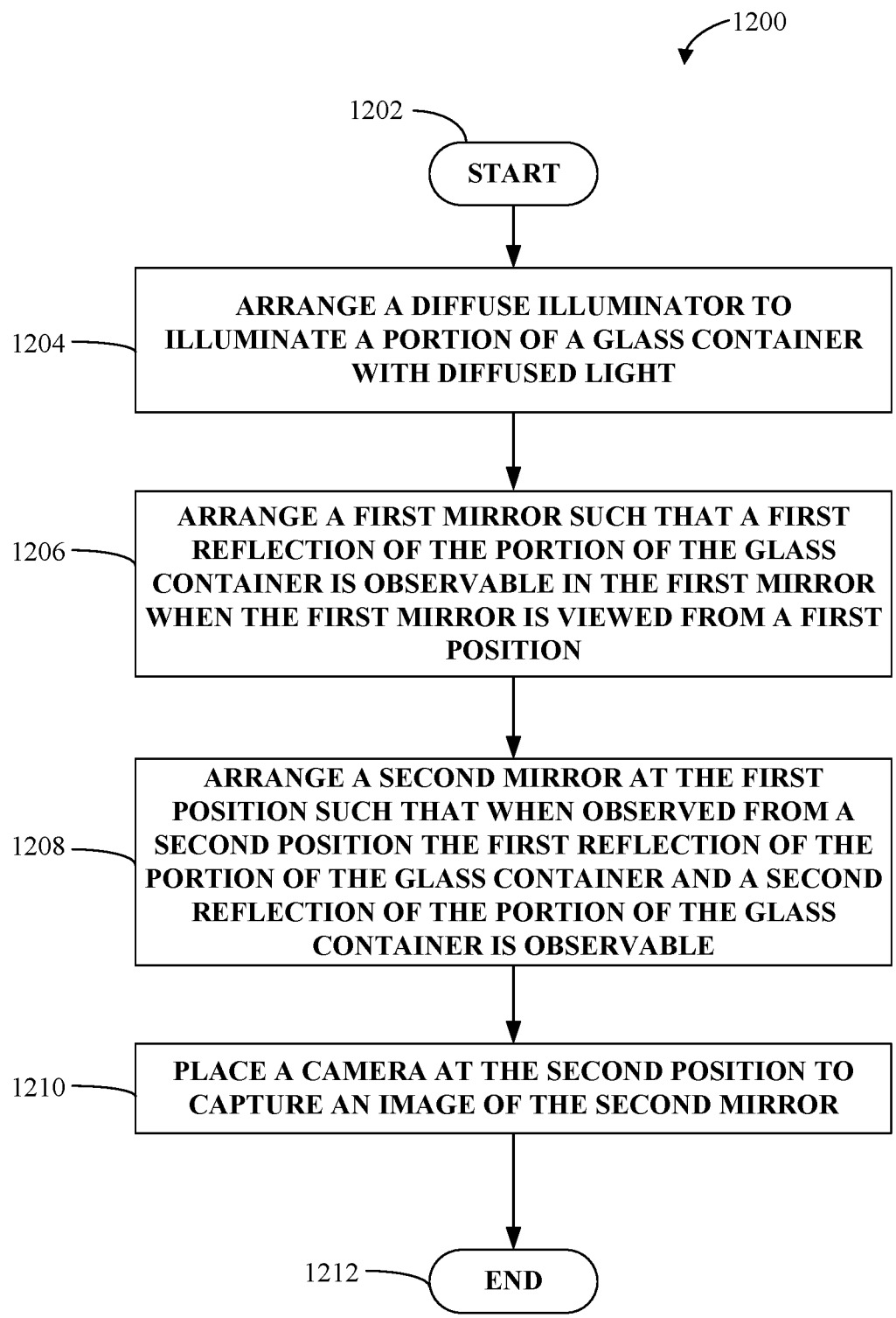
FIG. 12 is a flow diagram that illustrates an exemplary methodology for forming a container inspection system.

FIG. 12 illustrates an exemplary methodology 1200 relating to forming a container inspection system. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

The methodology 1200 starts at 1202, and at 1204, a diffuse illuminator is arranged to illuminate a portion of a glass container with diffused light. At 1206, a first mirror is arranged relative to a conveyor that is configured to transport glass containers such that when the portion of the glass container is illuminated with the diffuse light, a first reflection of the portion of the glass container is observable in the first mirror when the first mirror is viewed from a first position. At 1208, a second mirror is arranged at the first position such that when the portion of the glass container is illuminated with the diffuse light, and when the second mirror is viewed from a second position, the first reflection of the portion of the glass container in the first mirror is observable in the second mirror and a second reflection of the portion of the glass container is also observable in the second mirror. At 1210, a camera is placed at the second position. The camera can be configured to capture an image of the second mirror when the glass container is illuminated with the diffuse light such that the image captures the first reflection and the second reflection of the portion of the glass container. The methodology 1200 concludes at 1212.

In an embodiment of the methodology 1200, the first mirror is a planar mirror comprising an aperture. Arranging the first mirror may comprise placing the first mirror between the illuminator and the conveyor. A reflective surface of the planar mirror can be arranged to face toward the conveyor. The first mirror may be arranged relative to the illuminator such that diffuse light emitted by the illuminator passes through the aperture towards the conveyor.

In another embodiment of the methodology 1200, the first mirror is arranged such that when the portion of the glass container is illuminated with the diffuse light, a third reflection of the portion of the glass container is observable in the first mirror when the first mirror is viewed from a third position that is different from the first position. The methodology 1200 can further include arranging a third mirror at the third position such that when the portion of the glass container is illuminated with the diffuse light, and when the third mirror is viewed from the second position, the third reflection of the portion of the glass container in the first mirror is observable in the third mirror and a fourth reflection of the portion of the glass container is also observable in the third mirror. The image generated by the camera may capture the third mirror when the glass container is illuminated with the diffuse light such that the image captures the third reflection and the fourth reflection of the portion of the glass container.

In a version of this embodiment, the first mirror is arranged such that when the portion of the glass container is illuminated with the diffuse light, a fifth reflection of the portion of the glass container is observable in the first mirror when the first mirror is viewed from a fourth position that is different from the first position and the third position. The methodology 1200 can further comprise arranging a fourth mirror at the fourth position such that when the portion of the glass container is illuminated with the diffuse light, and when the fourth mirror is viewed from the second position, the fifth reflection of the portion of the glass container in the first mirror is observable in the fourth mirror and a sixth reflection of the portion of the glass container is also observable in the fourth mirror. The image generated by the camera can also capture the fourth mirror when the glass container is illuminated with the diffuse light such that the image captures the fifth reflection and the sixth reflection of the portion of the glass container.

In a form of this version, the centers of the second mirror, the third mirror, and the fourth mirror are equidistant to the camera.

Figure 13:
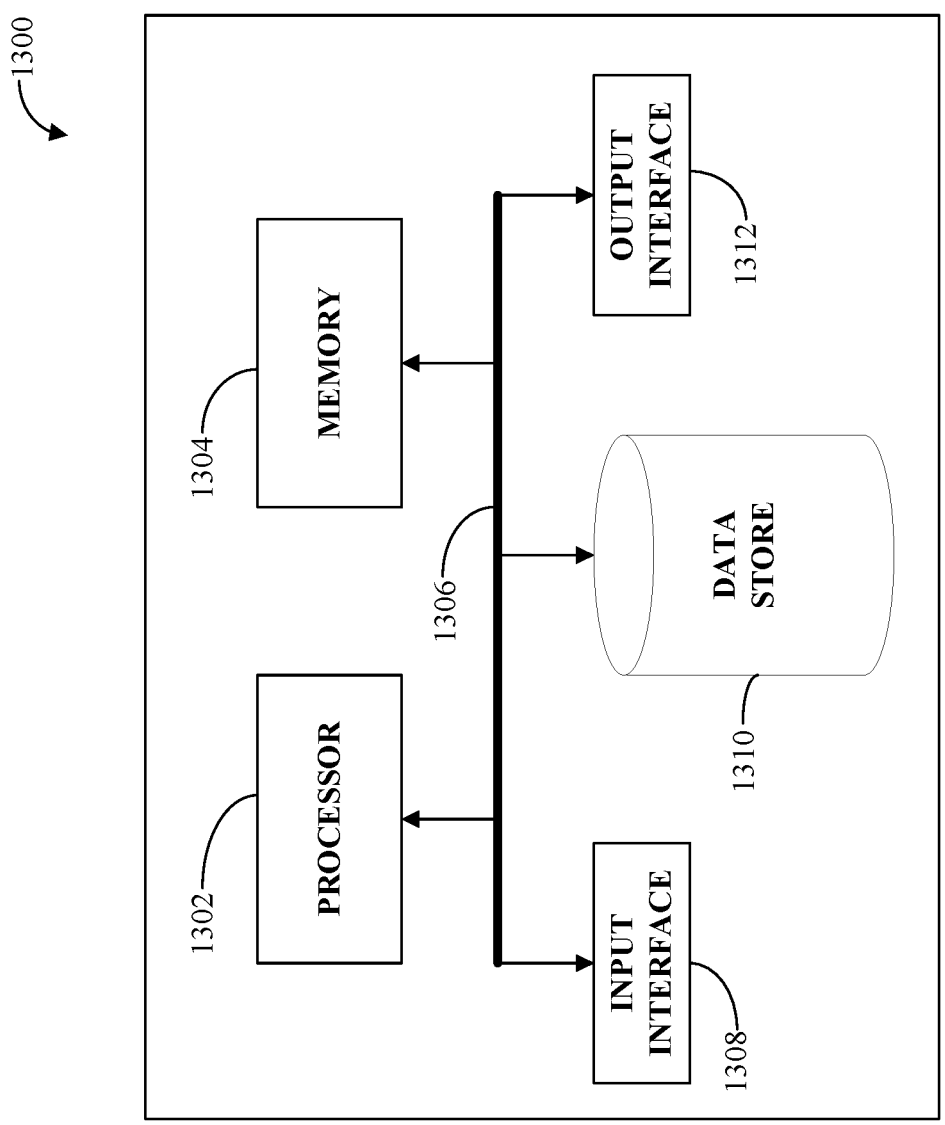
FIG. 13 is an exemplary computing device.

Referring now to FIG. 13, a high-level illustration of an exemplary computing device that can be used in accordance with the systems and methodologies disclosed herein is illustrated. For instance, the computing device 1300 may be or include a mobile computing device or the computing system. The computing device 1300 includes at least one processor 1302 that executes instructions that are stored in a memory 1304. The instructions may be, for instance, instructions for implementing functionality described as being carried out by one or more components discussed above or instructions for implementing one or more methods described above. The processor 1302 may be a GPU, a plurality of GPUs, a CPU, a plurality of CPUs, a multi-core processor, etc. The processor 1302 may access the memory 1304 by way of a system bus 1306. In addition to storing executable instructions, the memory 1304 may also store images, defect signatures, etc.

The computing device 1300 additionally includes a data store 1310 that is accessible by the processor 1302 by way of the system bus 1306. The data store 1310 may include executable instructions, images, statistical models, etc. The computing device 1300 also includes an input interface 1308 that allows external devices to communicate with the computing device 1300. For instance, the input interface 1308 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1308 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A glass container inspection system comprising:
    a diffuse illuminator configured to provide diffused light, wherein the diffuse illuminator is arranged to illuminate a portion of a glass container symmetrically about a central axis of the glass container;
    a first mirror;
    an image capture system that comprises a second mirror, wherein the image capture system is configured to generate an image of the second mirror, wherein the image includes a first view of the glass container illuminated by the diffused light and a second view of the glass container illuminated by the diffused light, wherein the image capture system generates the image as the diffused light passes through a sidewall of the glass container, wherein the first view is a view of the portion of the container reflected by the second mirror and the second view is a view of the portion of the container reflected by both the first mirror and the second mirror; and
    a computing system in communication with the image capture system, the computing system configured to output an indication as to whether the container is defective based upon the image generated by the image capture system, wherein the computing system is configured to output the indication responsive to detecting a check in the sidewall of the glass container.

2. The container inspection system of claim 1, wherein the first mirror is an annular mirror, wherein the annular mirror is arranged between the diffuse illuminator and the glass container being inspected, wherein the annular mirror includes an aperture with a cross-section smaller than an inner cross-section of an open end of the container.

3. The container inspection system of claim 2, wherein the second mirror is a planar mirror.

4. The container inspection system of claim 1, wherein the image capture system further includes a third mirror, wherein the image includes a third view of the glass container and a fourth view of the glass container, wherein the third view is a view of the portion of the container reflected by the third mirror and the fourth view is a view of the portion of the container reflected by both the first mirror and the third mirror.

5. The container inspection system of claim 1, wherein the image capture system includes a plurality of cameras configured to simultaneously capture a different image for each camera in the plurality of cameras, wherein each camera is configured to a capture an image comprising a view of the portion of the container illuminated by the diffused light and a view of a portion of the mirror.

6. The container inspection system of claim 5, wherein the plurality of cameras comprises four cameras.

7. The container inspection system of claim 1, wherein the image capture system includes a plurality of mirrors each configured to reflect views of the portion of the container and a camera configured to capture the image, wherein the image includes the reflections from the plurality of mirrors simultaneously.

8. The container inspection system of claim 7, wherein the plurality of planar mirrors comprises eight mirrors arranged along a curved path.

9. The container inspection system of claim 1, further comprising:
    a second image capture system configured to generate a second image that captures a plurality of views of the glass container,
    wherein the computing system is in communication with the second image capture system, wherein the indication output by the computing system is further based upon the second image.

10. The container inspection system of claim 9, further comprising:
    a second diffuse illuminator configured to provide diffused light;
    a third mirror configured to direct the diffused light from the second diffuse illuminator toward the glass container, wherein the third mirror includes an aperture with a cross-section smaller that an inner cross-section of an open end of the glass container,
    wherein the second image capture system captures the plurality of views of the container illuminated by the second diffuse illuminator.

11. The container inspection system of claim 1, further comprising:
    a rotation mechanism configured to rotate the glass container under the diffuse illuminator.

12. The container inspection system of claim 1, wherein outputting the indication as to whether the glass container is defective comprises determining that the glass container includes the check based upon template matching.

13. A method of forming a container inspection system comprising:
    arranging a diffuse illuminator to illuminate a portion of a glass container with diffused light;
    arranging a first mirror relative to a conveyor that is configured to transport glass containers such that as the portion of the glass container is illuminated with the diffuse light, a first reflection of the portion of the glass container is observable in the first mirror when the first mirror is viewed from a first position;

arranging a second mirror at the first position such that as the portion of the glass container is illuminated with the diffuse light, and upon the second mirror being viewed from a second position, the first reflection of the portion of the glass container in the first mirror is observable in the second mirror and a second reflection of the portion of the glass container is also observable in the second mirror; and placing a camera at the second position, wherein the camera is configured to capture an image of the second mirror as the glass container is illuminated with the diffuse light such that the image captures the first reflection and the second reflection of the portion of the glass container.

14. The method of claim 13, wherein the first mirror is a planar mirror comprising an aperture, and further wherein arranging the first mirror comprises placing the first mirror between the illuminator and the conveyor, wherein a reflective surface of the planar mirror is arranged to face toward the conveyor, and further wherein the first mirror is arranged relative to the illuminator such that diffuse light emitted by the illuminator passes through the aperture towards the conveyor.

15. The method of claim 13, wherein the first mirror is arranged such that as the portion of the glass container is illuminated with the diffuse light, a third reflection of the portion of the glass container is observable in the first mirror upon the first mirror being viewed from a third position that is different from the first position, the method further comprising:

arranging a third mirror at the third position such that as the portion of the glass container is illuminated with the diffuse light, and upon the third mirror being viewed from the second position, the third reflection of the portion of the glass container in the first mirror observable in the third mirror and a fourth reflection of the portion of the glass container is also observable in the third mirror, wherein the image generated by the camera captures the third mirror when the glass container is illuminated with the diffuse light such that the image captures the third reflection and the fourth reflection of the portion of the glass container.

16. The method of claim 15, wherein the first mirror is arranged such that as the portion of the glass container is illuminated with the diffuse light, a fifth reflection of the portion of the glass container is observable in the first mirror upon the first mirror being viewed from a fourth position that is different from the first position and the third position, the method further comprising:

arranging a fourth mirror at the fourth position such that as the portion of the glass container is illuminated with the diffuse light, and upon the fourth mirror being viewed from the second position, the fifth reflection of the portion of the glass container in the first mirror observable in the fourth mirror and a sixth reflection of the portion of the glass container is also observable in the fourth mirror, wherein the image generated by the camera captures the fourth mirror as the glass container is illuminated with the diffuse light such that the image captures the fifth reflection and the sixth reflection of the portion of the glass container.

17. The method of claim 16, wherein centers of the second mirror, the third mirror, and the fourth mirror are equidistant to the camera.

18. A container inspection system comprising:
a diffuse illuminator configured to provide diffuse light, wherein the diffuse illuminator is arranged to illuminate a portion of a glass container symmetrically about a central axis of the container;
a mirror arranged between the diffuse illuminator and the glass container being inspected, wherein the mirror includes an aperture with a cross-section smaller than an inner cross-section of an open end of the container;
a plurality of mirrors each arranged to reflect views of the portion of the container illuminated by the diffused light and views of a portion of the mirror;
a camera configured to capture an image, wherein the image includes the reflected views from the plurality of mirrors simultaneously; and
a computing system in communication with camera, the computing system configured to output an indication as to whether the container includes a check in a finish of the glass container based upon the image captured by the camera.

19. The glass container inspection system of claim 18, wherein the plurality of mirrors comprises between four and twenty-four mirrors.

20. The container inspection system of claim 18, wherein the plurality of planar mirrors comprises four mirrors arranged along a curved path.

* * * * *